United States Patent

Schwaerzler

[11] 4,040,580
[45] Aug. 9, 1977

[54] CONTROL APPARATUS FOR AN AIR BRAKE

[75] Inventor: Hans-Jüergen Schwäerzler, Taufkirchen, Germany

[73] Assignee: Messerschmitt-Boelkow-Blohm GmbH, Munich, Germany

[21] Appl. No.: 612,634

[22] Filed: Sept. 12, 1975

[30] Foreign Application Priority Data

Sept. 17, 1974 Germany ............................. 2444310
July 4, 1975 Germany ............................. 2529894

[51] Int. Cl.² .......................... B64C 13/36; B64C 9/32
[52] U.S. Cl. .................................. 244/78; 114/145 R; 244/203; 244/113; 91/400; 91/402
[58] Field of Search ............... 244/76 B, 76 C, 76 R, 244/78, 110, 85, 42 D, 42 DA, 42 DB, 42 A, 113; 91/400, 402; 114/145

[56] References Cited

U.S. PATENT DOCUMENTS

| 2,104,627 | 1/1938 | Manteuffel | 244/78 |
| 2,188,834 | 1/1940 | Fischel et al. | 244/76 B |
| 2,316,235 | 4/1943 | Gast | 244/76 B |
| 3,026,678 | 3/1962 | Kibele | 244/78 |
| 3,456,881 | 7/1969 | Beitler et al. | 244/85 |
| 3,913,450 | 10/1975 | MacGregor | 91/400 |

Primary Examiner—Trygve M. Blix
Assistant Examiner—Galen L. Barefoot
Attorney, Agent, or Firm—W. G. Fasse; W. W. Roberts

[57] ABSTRACT

The present apparatus controls the position of the brake flap or air brake of an aircraft. The air brake is operated by a power amplifier including a pressure cylinder and a piston. The piston is mechanically coupled to the brake flap or air brake in such a manner that the displacement of the brake flap is about proportional to the brake flap angle. The pressure in the cylinder is controlled in response to or as a function of the brake flap angle so that the flap is positioned at the angle required for the particular braking action, whereby the force caused by the dynamic or impact pressure is maintained in equilibrium with the force exerted by the pressure piston cylinder arrangement.

11 Claims, 8 Drawing Figures

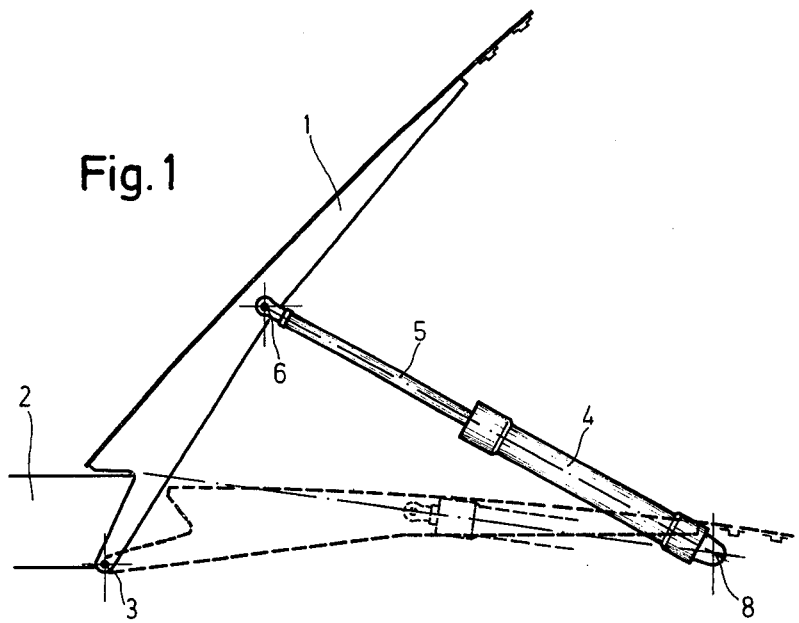
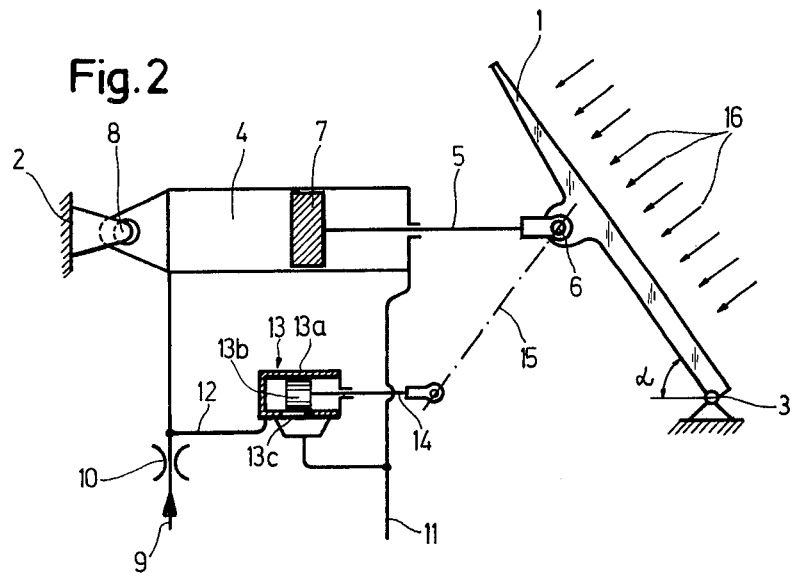

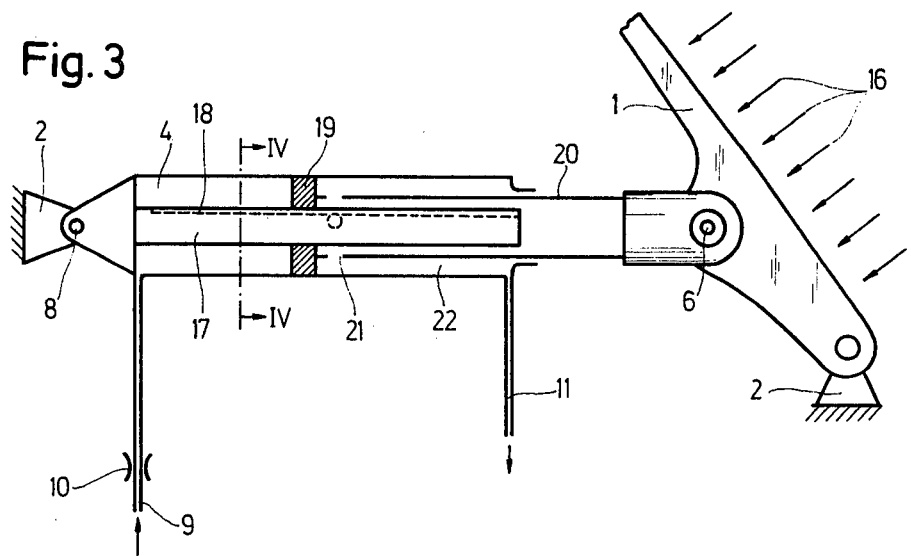
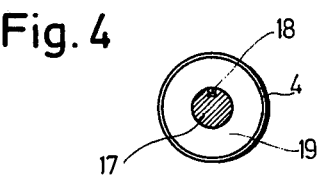
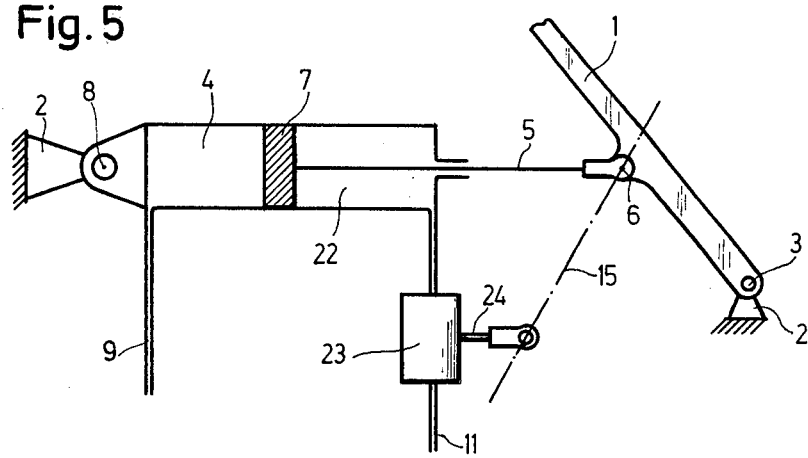

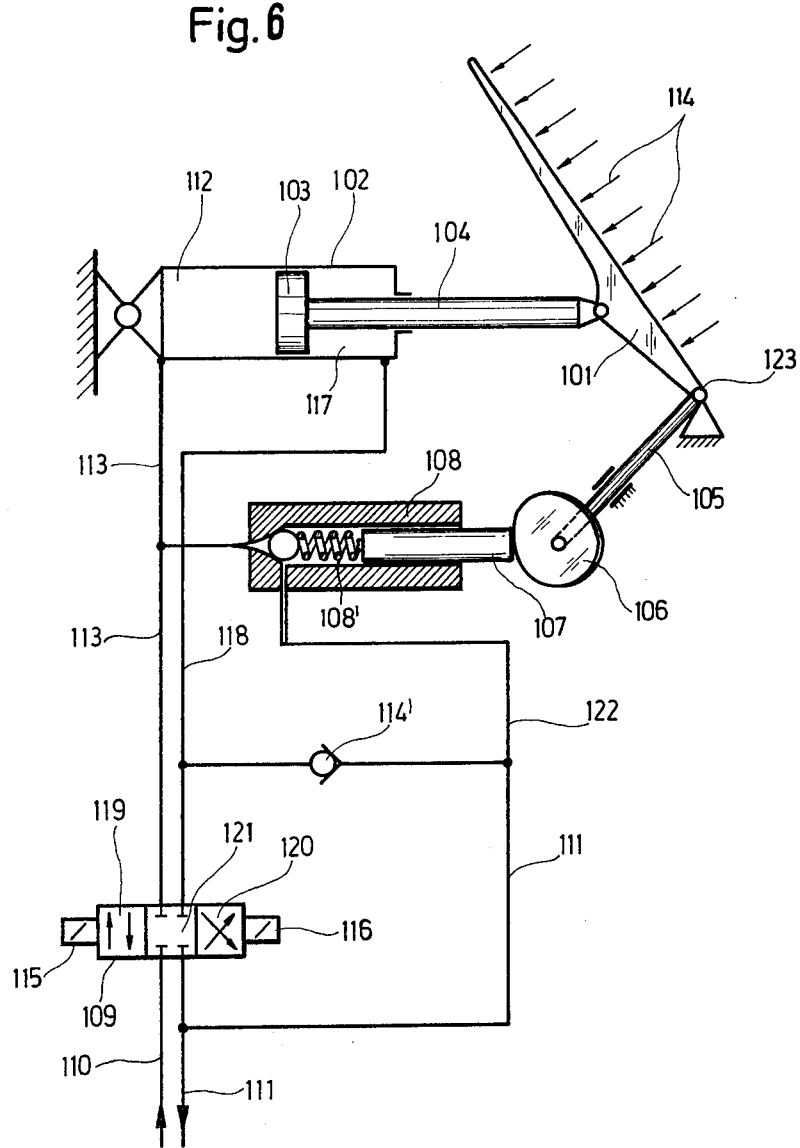

CONTROL APPARATUS FOR AN AIR BRAKE

BACKGROUND OF THE INVENTION

The present invention relates to a control apparatus for an air brake, especially for an aircraft. Conventionally such air brakes are operated pneumatically or hydrualically by means of a respective power amplifier comprising a pressure cylinder and a piston, whereby the latter is coupled mechanically to the air brake flap in such a manner that the piston displacement is about proportional to the angle of the air brake flap.

Control means of the just described type are used in aircrafts capable of high sub-sonic speeds, as well as super-sonic speeds, whereby high dynamic or impact pressures occur. In designing the control devices for such air brakes certain given or required decelerations of the aircraft at given speeds and at certain altitudes must be taken into account, whereby certain maximum decelerations must not be exceeded. In the light of these requirement, prior art control devices have the drawback that they provide an adequate braking action at low speeds, however, at high speeds, for example, corresponding to the speed of sound or a multiple of the speed of sound such prior art control devices develop too large a braking action.

The main reason for this undesirable feature of prior art control devices is seen in the installation of the pressure cylinder, whereby due to the limited space in the retracted position of the air brake flap, only small lever arms may be employed having an unfavorable mechanical advantage. Thus, it is necessary to provide a respectively high cylinder force to achieve the required opening moment. As a result, when the air brake flap is in its opened position holding moments are employed which are excessive and which, as a result, cause undesirably high brake power. Stated differently, the holding moments are larger than those resulting from the required brake powers. This feature of prior art control devices has the disadvantages that the mechanical features of the air brake flap and the mechanical features of the surrounding cell structure in which the air brake is located, must be dimensioned for unnecessarily high brake values. As a result, the air brake arrangement becomes rather heavy. A further disadvantage of prior art devices of this type is seen in that the pilot himself must control the extent of the flap displacement of the air brake. This requirement is an additional burden to the pilot, which in an emergency or in a military aircraft may have dangerous consequences.

As mentioned above, the flaps of the air brakes may be controlled by hydraulic or pneumatic means, whereby the former may include so called hydraulic torque motors. Any of the these drive or control means must be supported in the aircraft structure. Hence, the latter must be capable of taking up or providing the necessary reaction forces.

OBJECTS OF THE INVENTION

In view of the foregoing, it is the aim of the present invention to achieve the following objects, singly or in combination:

to provide a control apparatus for the steering of an air brake which avoids the above drawbacks, more specifically which has simple structural features and a low weight, so that it may be subjected to lower aerodynamic loads which are directly adequate for the particular instantaneous holding moment;

to provide a control device which will reduce the pilots burden to thereby increase the flight safety;

to construct a control device for an air brake in such a manner that a continuous balance is maintained between the dynamic or impact pressure and the force exerted by the piston cylinder arrangement of the control mechanism;

to construct the control mechanism in such a manner that the brake power is continuously adapted to the speed of the craft;

to assure that the power applied to the air brake flap at different flap angles corresponds to the desired brake power required for the particular flap angle;

to construct the control device as described herein in such a manner that the reaction forces applied to the aircraft structure are rather small and at a balanced level; and to keep the forces and correspondingly the reaction forces as small as possible in order to avoid requiring an unnecessary strengthening of the aircraft structure.

SUMMARY OF THE INVENTION

According to the invention there is provided a control mechanism for the steering or control of an air brake by means of a pneumatic or hydraulic power amplifier including a piston cylinder arrangement in which the piston is mechanically coupled to the flap or the air brake in such a manner that the piston displacement is about proportional to the brake flap angle. The pressure in the pressure cylinder is controlled in response to or as a function of the brake flap angle in such a manner that the angle required for any particular brake application is adjusted automatically, whereby the force generated by the dynamic air pressure is always in balance or in equilibrium with the force exerted by the piston cylinder arrangement.

In one embodiment according to the invention, flow resistance means are inserted in the hydraulic pressure line connected to the pressure cylinder. In addition, downstream of the flow resistance means there is connected to the pressure conduit a branch line which in turn is connected to the return flow conduit. A valve is arranged in the branch line to control the hydraulic liquid flow. The just mentioned valve in turn is coupled to the air brake flap in a pivoting manner. This particular embodiment according to the invention makes it now possible that more hydraulic liquid may now flow through the valve in the branch line in response to an increase in the flap angle so that the hydraulic liquid flow to the pressure cylinder is correspondingly reduced. However, the arrangement may also be such that depending on the control of the valve in the branch line more oil may be supplied to the pressure cylinder in response to the increasing of the flap angle. This particular embodiment of the invention has the further advantage that by a respective selection of the through flow characteristics of the valve, it is possible to adapt the brake power to the speed of the craft.

Another advantageous embodiment according to the invention controls the pressure in the pressure cylinder as a function of the flap angle in such a manner that the flap angle required for the particular brake action is adjusted by means of a flow resistance in the pressure conduit to the pressure cylinder arrangement, and that the piston is provided with a bore having a variable cross sectional area, so that the area varies depending upon the axial position of the piston in the cylinder. One realization according to the invention of this embodiment provides a rod having an axial groove extending through the bore in the piston with a gliding fit. The cross section of the rod varies continuously over its length. This arrangement has also the advantage to influence the size of the flap angle as a function of the aircraft speed. This is accomplished according to the invention by providing the cross section of the axial groove in said rod in such a manner that the size of the oil flow is controlled according to the desired brake power at different particular flap angles.

According to a further embodiment of the invention, which does not employ a flow impedence nor an oil flow control, there is provided a pressure regulator in the return flow conduit. The pressure regulator is coupled in a pivoting manner to the brake flap. In this embodiment the force exerted by the piston, that is, the effective cylinder pressure is influenced by the pressure regulator.

According to one embodiment the pressure regulator may be a spring biased valve by means of which a pressure responsive operational connection is provided from the pressure conduit of the pressure cylinder to the return flow conduit. The spring bias is arranged in such a manner that the biasing of the valve is reduced in response to the opening of the brake flap. This arrangement has the advantage that the brake flap may yield in a simple and reliable manner, when for example, unexpectedly high forces are exerted by the air flow onto the flap. Thus, the flap may yield until a new equilibrium is established. All the embodiments and the just mentioned embodiment in particular have the advantage that the structure of the aircraft does not have to supply exceedingly large reaction forces for the brake mechanism. Accordingly advantageous weight reductions are achieved, because the reaction forces may be very small and in addition the reaction forces are kept on a substantially uniform level throughout the range of braking action. Incidentally, the reduction of the biasing of the valve may, for example, be accomplished by providing the value plug with a cam follower which cooperates with a cam disk, which is rigidly connected through a shaft with the brake flap at the prior or hinge point of the latter. Instead of controlling the tappet valve by a cam disk, it may be controlled by electromechanical means.

BRIEF FIGURE DESCRIPTION

In order that the invention may be clearly understood, it will now be described, by way of example, with reference to the accompanying drawings, wherein:

FIG. 1 illustrates the conventional arrangement of a brake flap of an air brake with a piston cyliner arrangement, wherey the full line illustration shows the open position and the dashed line illustration shows the closed position;

FIG. 2 illustrates a hydraulic circuit arrangment according to the invention for reducing the cylinder pressure by means of a slide valve;

FIG. 3 illustrates a hydraulic circuit arrangement for reducing the cylinder pressure by means of a rod sliding inside the piston;

FIG. 4 illustrates a sectional view along the section line IV—IV in FIG. 3;

FIG. 5 is a hydraulic circuit arrangement for reducing the cylinder pressure by means of a pressure regulator;

FIG. 6 shows a circuit arrangement suitable for hydraulic or pneumatic control of the brake flap by mechanical pressure control;

DETAILED DESCRIPTION OF EXAMPLE EMBODIMENTS

Figure 7:
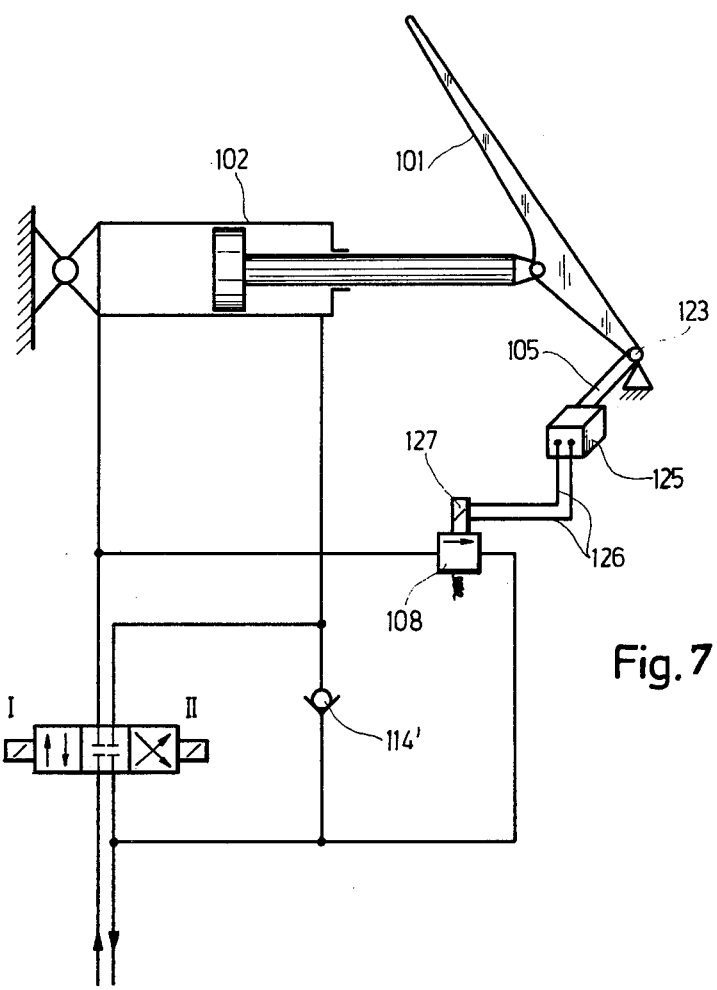
FIG. 7 illustrates an embodiment in which the pressure is controlled by electromechanical means.

FIG. 1 illustrates a conventional arrangement of an air brake flap 1 secured to the body 2 of an aircraft by pivot means 3. The piston rod 5 is slidable in the cylinder 4. The outer end of the piston rod 5 is pivoted to the flap 1 by pivot means 6. It will be noted that in the closed position shown in dashed lines in FIG. 1 there is only a very small mechanical advantage available for the actuation of the flap.

FIG. 2 illustrates an embodiment according to the invention in which the cylinder 4 holds a piston 7 also pivoted by pivot means 6 and the piston rod 5 to the flap 1. Thus, each particular position of the brake flap 1 corresponds to a respective position of the piston 7. The cylinder 4 is pivoted to the pivot point 8 of the body 2 of the craft. The hydraulic conduit 9 connects a source of pressure to the cylinder 4 through a flow impedance 10. The return flow conduit 11 leads back to the pressure source, not shown. A branch line 12 is connected to the pressure conduit 9 downstream of the flow impedence 10. The branch line 12 is connected to a valve 13 which in turn is connected to the return flow conduit 11. The valve 13 comprises a cylinder 13a, a slide member 13b, and a control slot 13c. Such valves are known per se and operate to control the flow cross sectional area for the hydraulic oil by the adjustment of the slide member 13b. The slide member 13b is connected through a slide rod 14 and coupling means 15 to the pivot point 6 of the flap 1.

The operation of the arrangement according to FIG. 2 will now be described. If the pilot desires to apply the brakes, he will actuate a valve not shown by means of which oil under pressure is supplied to the pressure conduit 9. The oil flows first fully through the flow impedence 10 into the cylinder 4 and presses the piston 7 to the right and thus the flap 1 against the air flow, the force of which is indicated by the reference numeral 16. Thus, the brake flap 1 is forced against the air flow. In response to the tilting of the brake flap 1, the sliding member 13b is also displaced through the coupling means 15, whereby oil may flow through the branch line 12 back into the return flow conduit 11. The resulting pressure drop across the flow impedence 10 causes a pressure reduction in the cylinder 4 as long as the desired flap angle α corresponds to an equilibrium between the force of the air flow 16 and the force applied by the piston cylinder arrangement.

The embodiment illustrated in FIG. 3 comprises a cylinder 4 and a piston rod 17 provided with an axially extending groove 18, the cross sectional area of which varies continuously along the length of the rod. The piston 19 has a respective aperture and slides relative to the rod 17. The piston 19 is connected to the brake flap 1 by means of a hollow piston rod 20, which is provided with bores 21 for the oil flow. The rod 17 extends through the piston 19 into the piston rod 20. FIG. 4 shows the sectional view along section line IV—IV in FIG. 3 and illustrating the shape of the groove 18.

The arrangement according to FIG. 3 operates as follows. When oil under pressure is admitted through the pressure conduit 9, and across the flow impedance 10 into the cylinder 4, the piston 19 is displaced to the right, and the brake flap 1 will be opened. During this oil flow, some of the oil will flow through the groove 18 and through the bores 21 back into the cylinder space 22. The cylinder space 22 is connected to the return flow conduit 11. The return flow of the oil causes a flow and accordingly a pressure drop across the flow impedance 10. The function is analogous to that described with reference to FIG. 2, whereby again an equilibrium is established for any required flap position, between the force resulting from the dynamic air flow 16 and the force applied through the piston rod 20.

In the embodiment of FIG. 5 the piston 7 is again arranged in the cylinder 4 and connected through the piston rod 5 with the brake flap 1 as described. A pressure regulator 23 is arranged in the hydraulic return flow conduit 11. The actuator rod 24 of the pressure regulator 23 is pivoted through coupling means 15 to the pivot means 6 of the brake flap 1. Pressure regulating valve means which could be employed for the pressure regulator 23 are well known in the art.

The arrangement according to FIG. 5 operates as follows. Oil under pressure passing through the conduit 9 into the cylinder 4 causes the opening of the brake flap 1 by moving the cylinder 7 to the right and transmitting such movement to the flap through the piston rod 5. Simultaneously with the opening movement of the flap the connecting coupling 15 operates the actuator rod 24 of the pressure regulator 23, whereby a counter pressure is established in the cylinder space 22. As in the embodiment of FIGS. 2 and 3, the adjustment of the pressure regulator 23 in FIG. 5 is continued until the equilibrium between the dynamic flow forces 16 and the force applied by the piston rod 5 is established.

FIG. 6 illustrates a detailed circuit diagram for the pressure control employed according to the invention to keep the force applied to the brake flap in equilibrium with the force exerted by the dynamic air flow 114. A control valve 109 is arranged in the hydraulic fluid supply line 110 and in the return flow conduit 111. The valve is controlled by two solenoids 115 and 116. When the solenoid 115 is actuated the flow is indicated by the arrows in the left-hand portion 119 of the valve 109. In other words, the supply conduit 110 is connected to the conduit 113 and the return flow conduit 111 is connected to the conduit 118. Thus, hydraulic fluid from a pump or the like not shown may pass through the conduit 110, the valve 109, the conduit 113 into the space 112 of the cylinder 102. As a result, the piston 103 in the cylinder 102 is moved to the right by the inflow of the hydraulic liquid and the piston rod 104 respectively moves the brake flap 101 into a braking position. The thus increasing dynamic pressure applied to the brake flap 101 is indicated by air flow arrows 114. The hydraulic liquid displaced by the just described movement in the cylinder space 117, flows through the conduit 118 and the valve 109 back to the return conduit 111 connected to a supply tank of the pressure source.

If the pilot desires to terminate the outward movement of the brake flap 101, he de-energizes the solenoid or relay 115 to close the valve 109. The closed condition of the valve 109 is shown at 121 in FIG. 6.

In order to return the brake flap 101 into the retracted position, the pilot energizes a solenoid 116, whereby the valve 109 opens in a manner to reverse the flow direction as indicated at 120 in FIG. 6. Thus, fluid under pressure flows through the conduit 110, the valve 109, the conduit 118 into the cylinder space 117, whereby the piston 103 is displaced to the left and the return flow from the cylinder space 112 is now through the conduit 113, the valve 109 and the conduit 111, whereby the flap 101 is returned into its retracted position.

According to the invention there is provided a pressure responsive connection between the pressure conduit 113 and the return conduit 111 through a spring biased valve 108. The biasing force of the spring 108' in the valve 108 is adjustable as a function of the opening angle of the brake flap 101. More specifically, the biasing force of the spring 108' is reduced as the opening angle increases. Incidentally, the opening angle α is shown in FIG. 2. The control of the biasing force of the spring 108' is accomplished by a cam disk 106 operatively connected to the pivot 123 of the brake flap 101 by means of a coupling shaft 105. The cam disk 106 cooperates with a cam follower 107 in the valve 108, whereby the angular position of the brake flap 101 determines directly the biasing force of the spring 108'.

The arrangement of FIG. 6 operates as follows. When the valve 109 is closed the pressure in the cylinder 102 will increase in response to the increasing dynamic air pressure 114 until the valve 108 opens. Thus, the flow medium for example, hydraulic oil flows out of the pressure cylinder space 112, whereby according to the invention the piston 103 with its rod 104 may yield to the left and the opening angle of the brake flap 101 is reduced. This reducing of the opening angle α simultaneously causes an increase of the biasing force of the valve 108' through the coupling elements 105, 106, 107 whereby the opening pressure is again increased, and the brake flap 101 assumes a stationary position in euqilibrium with the dynamic pressure 114. Thus, making the opening angle α of the brake flap 101 smaller takes place automatically in response to the dynamic pressure 114, whereby, according to the invention, a substantial reduction of the forces is accomplished which normally heretofore would have to be taken up by the aircraft structure. If desired, it may be advantageous to locate the pressure control valve 108 directly in the conduit 113.

FIG. 7 illustrates an embodiment similar to that of FIG. 6, however, the mechanical control of the pressure regulating valve 109, as shown in FIG. 6, is replaced by an electrical control as illustrated in FIG. 7. A position responsive sensor 125 converts the angular position of the shaft 105 into an electrical signal which is supplied through the conductors 126 to a solenoid 127 for actuating the valve 108. For example, the position responsive sensor 125 could be a potentiometer combined with the necessary circuit means, such as amplifiers and the like for providing an electrical signal corresponding directly to the angular function. The circuit means for converting or adapting the mechanical rotation of the shaft 105 into a corresponding electrical signal may all be included in a common housing. Such means are well known in the art.

Incidentally, in FIG. 6 and in FIG. 7 a check valve or non-return valve 114' is connected in parallel to the valve 109 in a conventional manner.

Figure 8:
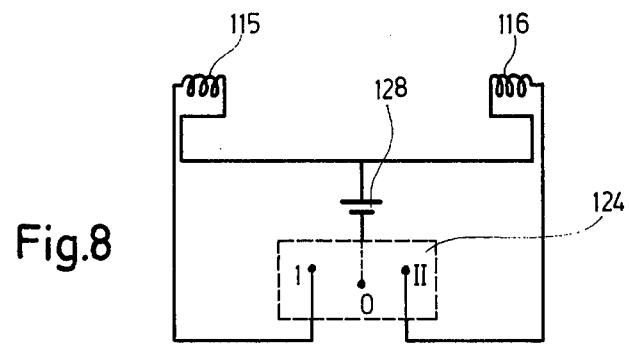
FIG. 8 illustrates an electric circuit arrangement for the actuation of the main control valve.

FIG. 8 illustrates a circuit arrangment for the actuation of the valve 109 by means of a single pole-double throw switch 124. The two solenoid coils 115 and 116 may alternately be connected to the battery 128 depending on the position of the switch 124. Normally, the switch will be in the shown O position, whereby both solenoids 115, 116 are de-energized. Incidentally, it will be appreciated that the control employed according to the invention may be of the electro-hydraulic type or of the electro-pneumatic type. In both instances, the control of the brake force applied to the flap will be such, that a continuous balance is maintained between the dynamic pressures and the brake force.

Although the invention has been described with reference to specific example embodiments, it is to be understood, that it is intended to cover all modifications and equivalents within the scope of the appended claims.

What is claimed is:

1. A control apparatus for an air brake flap comprising pressure responsive power drive means (4,7) including a power drive cylinder piston arrangement, means (5) operatively connecting said air brake flap to said power drive means for moving said air brake flap through a range of angular positions, pressure control means (13) operatively associated with said power drive means (4), and air brake flap position response means directly and operatively interconnected between said pressure control means (13) and said air brake flap whereby said pressure control means (13) is continuously and directly responsive to the angular positions (d) of said air brake flap (1) to control the pressure in said power drive cylinder as a direct function of said angular positions of the air brake flap in such a manner that the flap at all times assumes the postion determined by the required braking action, whereby the dynamic pressure exerted by the air flow on the air brake flap is continuously in equilibrium with the pressure in said power drive means.

2. The control apparatus according to claim 1, wherein said pressure responsive power drive means comprise inlet conduit means connected to said cylinder piston arrangement, and return conduit means connected to said cylinder piston arrangement, said pressure control means comprising flow resistance means arranged in said inlet conduit means, by-pass conduit means interconnecting said inlet conduit means and return conduit means downstream of said flow resistance means, and valve means operatively arranged in said by-pass conduit means, said air brake postion responsive means including actuating means operatively interconnecting said air brake flap and said valve means.

3. The control apparatus according to claim 1, wherein said pressure responsive power drive means comprise inlet conduit means connected to said cylinder piston arrangement, and return conduit means connected to said cylinder pistion arrangement, said pressure control means comprising flow resistance means arranged in said inlet conduit means, said cylinder piston arrangement comprising means having a flow passage with a sectional area which is variable along the length of the cylinder piston arrangement.

4. The control apparatus according to claim 3, wherein said cylinder piston arrangement comprises a cylinder, a piston in said cylinder, a bore through the piston, a stationary rod held in position inside said cylinder and extending through said bore in the piston, said stationary rod having a longitudinal groove therein, said groove having a sectional area which varies continuously over the length of the rod.

5. The control apparatus according to claim 4, wherein said stationary rod is secured inside said cylinder at one end thereof whereby the rod has a secured end and a free end, said groove having a sectional area which increases from said secured end toward said free end, said connecting means and said air rake flap position responsive means locating said piston along said rod in response to the angular positon of said air brake flap whereby the flow of pressure medium through said piston corresponds to the required brake power.

6. The control apparatus according to claim 5, wherein said connecting means and said air brake flap position responsive means for locating said pistion comprise a hollow piston rod pivoted at one end thereof to said air brake flap and secured at its other end to said piston, said stationary rod extending through said piston and into said hollow piston rod, said hollow piston rod having openings therein to permit flow of pressure medium through said groove to said return conduit means, said flow of pressure medium depending on the particular position of the piston along the length of said stationary rod and thus on the angular position of said air brake flap.

7. The control apparatus according to claim 1, wherein said pressure responsive power drive means comprise inlet conduit means connected to said cylinder piston arrangement and return flow conduit means connected to said cylinder piston arrangement, said pressure control means comprising pressure regulating means arranged in said return flow conduit means, said connecting means and said air brake flap position responsive means comprising coupling means operatively interconnecting said pressure regulating means and said air brake flap.

8. The control apparatus according to claim 7, wherein said pressure regulating means comprise electromechanical means for regulating the pressure in said return flow conduit.

9. The control apparatus according to claim 7, wherein said pressure regulating means comprise valve means, conduit means operatively connecting said valve means to said inlet conduit means and to said return flow conduit means, valve biasing means arranged for cooperation with said valve means, said coupling means being operatively arranged to vary the biasing force of said valve biasing means in responsive to the angular position of said air brake flap whereby the biasing of said valve is reduced as the opening angle of said air brake flap increases.

10. The control apparatus according to claim 9, wherein said coupling means for varying the biasing force comprise cam follower tappet means, cam means arranged for cooperation with said cam follower tappet means, and shaft means rigidly connecting said cam means to said air brake flap.

11. The control apparatus according to claim 10, wherein said air brake flap comprises pivot means, said shaft means being connected to said pivot means of said air brake flap.

* * * * *

UNITED STATES PATENT OFFICE
CERTIFICATE OF CORRECTION

Patent No. 4,040,580          Dated August 9, 1977

Inventor(s) Hans-Jürgen Schwärzler

It is certified that error appears in the above-identified patent and that said Letters Patent are hereby corrected as shown below:

In the cover sheet, Item [75] correct the spelling of the inventor's name to read: --Hans-Jürgen Schwärzler--

Column 7, line 22, change "d" to --$\alpha$-- as in column 4, line 51 to adapt the claim to the specification.

Column 8, line 6, change "rake" to --brake--.

Signed and Sealed this

Twenty-ninth Day of November 1977

[SEAL]

Attest:

RUTH C. MASON      LUTRELLE F. PARKER
*Attesting Officer*      *Acting Commissioner of Patents and Trademarks*